Figure 1:
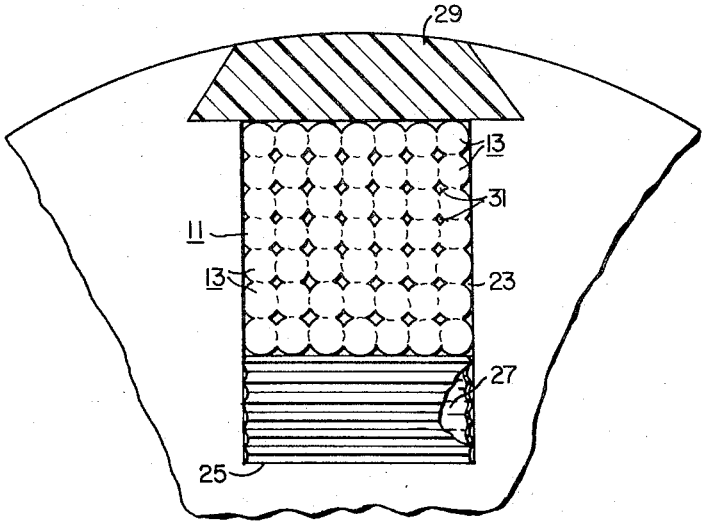
Figure 1A:
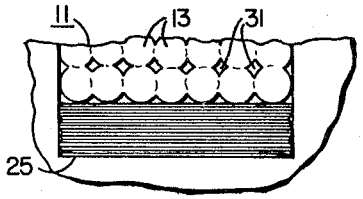
Figure 2:
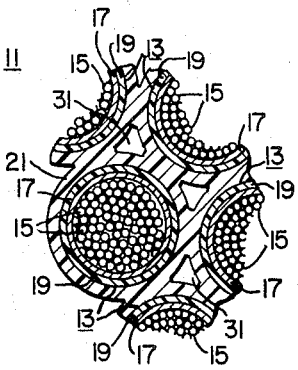

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 9, 1973

915 O.G. 384

T915,004

METHOD OF FABRICATION AND STRUCTURE OF A MECHANICALLY STABLE ELECTRICAL WINDING HAVING COOLING OPENINGS THEREIN

Daniel W. Deis, Pittsburgh, Pa., assignor to Westinghouse Electric Corporation, Pittsburgh, Pa.

Filed Nov. 16, 1972, Ser. No. 307,314
**Int. Cl. H02k *9/00***
U.S. Cl. 310—52
1 Sheet Drawing. 13 Pages Specification

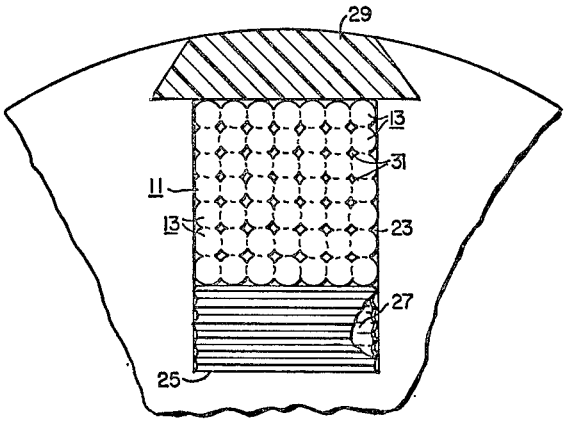

Insulated wire coated with a bonding material is formed into cables and wound in an appropriate chamber. A pressurizing material is utilized to compress the wires in the chamber. The pressurizing material is then hardened to maintain the wires in the compressed state. Heat is then applied to cause the bonding material to bond the wires together and rigidly maintain them in the positions they occupy when compressed.

Oct. 9, 1973 D. W. DEIS T915,004

METHOD OF FABRICATION AND STRUCTURE OF A MECHANICALLY STABLE ELECTRICAL WINDING HAVING COOLING OPENINGS THEREIN

Filed Nov. 16, 1972